Jan. 14, 1930. J. F. O'CONNOR 1,743,864
RESILIENT UNIT FOR CAR TRUCKS
Filed Aug. 1, 1925

Witness
Wm. Geiger

Inventor
John F. O'Connor
By George O. Haight
His Atty.

Patented Jan. 14, 1930

1,743,864

UNITED STATES PATENT OFFICE

JOHN F. O'CONNOR, OF CHICAGO, ILLINOIS, ASSIGNOR TO W. H. MINER, INC., OF CHICAGO, ILLINOIS, A CORPORATION OF DELAWARE

RESILIENT UNIT FOR CAR TRUCKS

Application filed August 1, 1925. Serial No. 47,471.

This invention relates to resilient units for car trucks.

An object of the invention is to provide a cushioning unit adapted to be used in connection with car trucks and the like, in place of the ordinary clusters of coiled springs, said unit including relatively movable elements with resilient means interposed therebetween, and so arranged that upon the approach of the movable elements, a combined resilient and frictional resistance is afforded.

Other and further objects of the invention will more fully and clearly appear from the description and claims hereinafter following.

Figure 1:
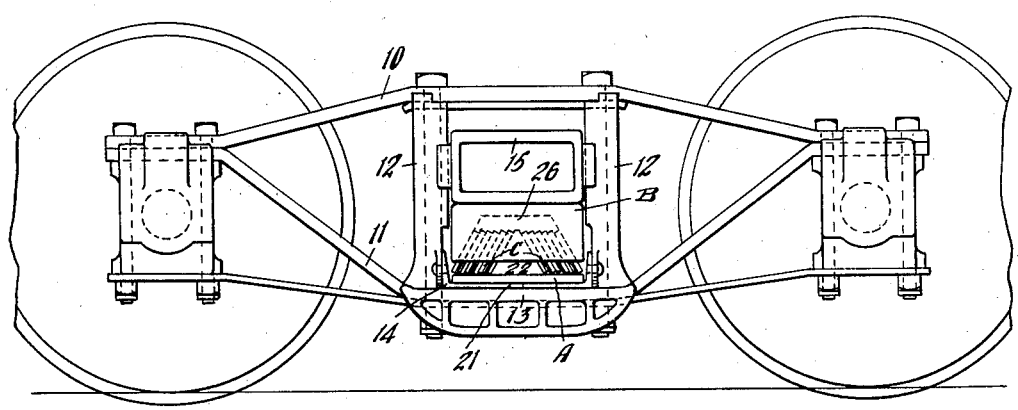
Figure 2:
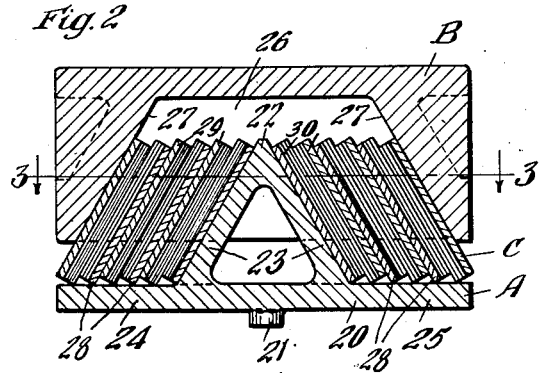
Figure 3:
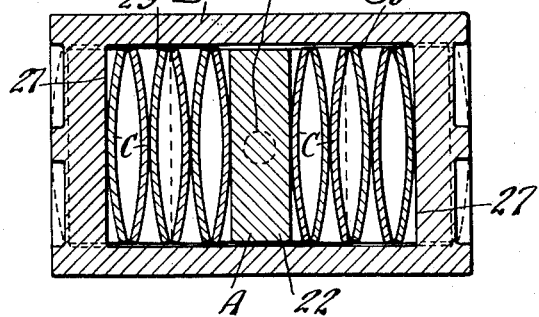

In the drawing, Figure 1 is a side elevation of a railway truck showing my invention in connection therewith; Figure 2 is an enlarged longitudinal vertical sectional view through the resilient unit; and Figure 3 is a horizontal sectional view on the line 3—3 of Figure 2.

Referring to drawing, 10 and 11 denote the top and bottom arch members of a common type of truck, while 12—12 denote the bolster guide columns, 13 the spring plank platform, 14 the spring plank, and 15 the truck bolster. In this connection, although only one side of the truck is illustrated in the drawing, it will be understood that both sides of the truck are similar, and that my invention contemplates the use of a resilient truck unit in connection with each side frame of the truck, the unit being adapted to be interposed between the spring supporting means of the respective side frames and the related ends of the bolster.

The resilient truck unit contemplated by my invention, broadly comprises a base or supporting element A, a cooperating element B adapted to be relatively movable with reference to the element A, and resilient means C, interposed between said relatively movable elements.

The base member A includes an elongated supporting plate 20, of a size and configuration as to fit between the bolster guide columns 12—12, and is provided on its undersurface with a lug 21 adapted to engage an aperture in the spring plank 14 when in position upon the truck. The opposite side of the base plate 20 is formed to provide a central transversely disposed hollow ridge 22, said ridge preferably being of triangular formation in cross-section, the inclined sides 23 of the ridge providing a combined stop and support for the resilient means C, which bear against the same. The flat portions 24 and 25 of the opposite side of the plate 20, provide surfaces upon which the resilient means C are supported for slidable movement.

The element B is of substantially box-like form, having a recess or chamber 26 adapted for the reception of the ridge 22, and the resilient means C, the end walls defining the recess 26, diverging outwardly to provide oppositely extending friction surfaces 27.

Interposed between the elements A and B and extending within the recess 26 of the element B, are the resilient means C. The resilient means C comprises a plurality of transversely curved spring plates, arranged in oppositely disposed sets 29 and 30, the set 29 being interposed between the angular surface 23 of the ridge 22, and the adjacent friction surface 27 of the member B, and the other set 30 being arranged between the opposite face of the ridge 22 and the adjacent friction surface 27 of the member B. In each of the sets 29 and 30, the plates are preferably arranged in pairs, the plates of each pair being oppositely disposed with reference to each other, the plates of the set 29 having their ends resting upon the supporting surface 25 at one side of the ridge 22, and disposed in an inclined position so as to rest against said ridge, and the opposite set 30 of such plates being inclined in the opposite direction and resting against the opposite face of said ridge, the member B fitting over the ridge and the plates so that the friction surfaces 27 bear upon the outermost plates of each of the sets 29 and 30.

In operation, upon downward movement of the member B relative to the member A, the spring plates of each set will be compressed between the angular surfaces of the ridge 22, and the inclined wedge surfaces 27 of the member B, and during this action a frictional resistance is provided due to the relative movement between the wedge surfaces 27 and the adjacent surfaces of the outside plates of each set, and additional frictional resistance will be developed due to the engagement of the lower ends 28 of the plates C upon the supporting surfaces 24 and 25 as the plates of each set move inwardly toward the ridge 22, it being noted that this action is intensified due to the fact that the weight of the member B, and the load carried thereby, are supported upon the spring plates. When pressure is reduced or removed from the member B, the same will resume its initial position due to the action of the spring plates upon the inclined surfaces 27 of the element B.

By the above described arrangement, a powerful combined resilient and frictional resistance is provided in a simple and effective manner, due to the combined flexing of the springs, and the frictional resistance developed between the movable spring elements and the relatively movable enclosing and supporting parts.

While I have herein shown and described the preferred manner of carrying out my invention, the same is merely illustrative and I contemplate all changes and modifications that come within the scope of the claims appended hereto.

I claim:

1. In a structure of the character described, the combination with a base member provided with a central abutment tapering from its inner end outwardly; a plurality of curved spring plates resting against said abutment; and a second element fitting over said springs and said abutment and provided with opposite wedge surfaces bearing upon the spring plates remote from said central abutment, said wedge surfaces being relatively movable with respect to said remote springs upon relative movement between said base member and said element.

2. In a cushioning unit of the character described, the combination with a yielding compressible resistance means; of elements relatively movable toward and away from each other in a path at an angle to the direction in which said yielding means is compressible; and wedge means movable respectively with said elements for flexing said yielding means, said wedge means having direct frictional contact with said yielding means.

3. In means for absorbing shocks between the body and truck members of a car, the combination with a wedge member fixed with respect to the car body and movable in a vertical plane, said member having a wedge face inclined at an acute angle to the vertical; a second wedge member fixed to the truck and having a wedge face disposed parallel to and spaced from said first named wedge face; and spring resistance means interposed between said faces and opposing relative approach of said members toward each other, said spring resistance including spring plates having frictional contact with said wedge faces.

4. In means for absorbing shocks between the body and truck bolster members of a car, the combination with a supporting member fixed to said truck; of a laterally compressible spring means on said supporting member; and a member fixed to the car body and movable in a vertical plane with reference to the truck member toward and away from said support, said member fixed to the car body having opposed upwardly converging spaced faces, each of said faces being disposed at an acute angle to the vertical, said faces embracing said spring means for contracting the same upon relative approach of said members.

5. In means for absorbing shocks between the body and truck bolster members of a car, the combination with a support fixed to the truck member; of laterally compressible spring means on said support; and means fixed to the car body and movable in a vertical plane with reference to the truck member toward and away from said support, said last named means including opposed upwardly converging spaced surfaces, each of said surfaces being disposed at an acute angle to the vertical, said surfaces embracing the spring means for contracting the same upon relative approach of said members, and said spring means including plate spring members having frictional engagement with said surfaces.

In witness that I claim the foregoing I have hereunto subscribed my name this 29th day of July 1925.

JOHN F. O'CONNOR.